(12) United States Patent
Shirakawa

(10) Patent No.: US 12,434,761 B2
(45) Date of Patent: Oct. 7, 2025

(54) STROKE SENSOR

(71) Applicant: Proterial, Ltd., Tokyo (JP)

(72) Inventor: Yohei Shirakawa, Tokyo (JP)

(73) Assignee: Proterial, Ltd., Tokyo (JP)

( * ) Notice: Subject to any disclaimer, the term of this patent is extended or adjusted under 35 U.S.C. 154(b) by 504 days.

(21) Appl. No.: 17/988,343

(22) Filed: Nov. 16, 2022

(65) Prior Publication Data

US 2023/0150571 A1    May 18, 2023

(30) Foreign Application Priority Data

Nov. 17, 2021   (JP) .................. 2021-187359

(51) Int. Cl.
*B62D 5/09*    (2006.01)
*B62D 5/00*    (2006.01)

(52) U.S. Cl.
CPC ............. *B62D 5/092* (2013.01); *B62D 5/001* (2013.01)

(58) Field of Classification Search
CPC .... B62D 5/092; B62D 5/001; B62D 15/0225; G01D 5/145; G01D 2205/73; G01D 2205/773; G01D 5/202; G01D 2205/14
See application file for complete search history.

(56) References Cited

U.S. PATENT DOCUMENTS

| | | | |
|---|---|---|---|
| 6,593,734 B1 * | 7/2003 | Gandel | G01B 7/30 324/207.2 |
| 2007/0132449 A1 * | 6/2007 | Madni | G01D 5/246 324/207.25 |
| 2017/0096161 A1 * | 4/2017 | Ko | B62D 15/024 |
| 2024/0343303 A1 * | 10/2024 | Shirakawa | B62D 15/0225 |
| 2024/0359738 A1 * | 10/2024 | Shirakawa | B62D 15/0225 |
| 2024/0361154 A1 * | 10/2024 | Shirakawa | G01D 5/2053 |

FOREIGN PATENT DOCUMENTS

| | | | | |
|---|---|---|---|---|
| CN | 116733920 A | * | 9/2023 | ............. F16H 25/24 |
| DE | 102020211979 A1 | * | 4/2021 | ......... B62D 15/0225 |
| FR | 3020872 A1 | * | 11/2015 | ......... B62D 15/0215 |
| FR | 3036479 A1 | * | 11/2016 | ............. G01D 5/145 |
| JP | H11500828 A | * | 1/1999 | ............. G01D 5/145 |
| JP | 2001505667 A | * | 4/2001 | ............. G01D 5/145 |
| JP | 2004205327 A | * | 7/2004 | |
| JP | 2007155698 A | * | 6/2007 | ............. G01D 5/246 |
| JP | 2011107062 A | * | 6/2011 | |
| WO | 2021/210125 A1 | | 10/2021 | |

* cited by examiner

*Primary Examiner* — Drew J Brown
(74) *Attorney, Agent, or Firm* — Scully, Scott, Murphy & Presser, PC

(57) ABSTRACT

A stroke sensor is provided with two disk-shaped rotors configured to rotate with a stroke of a measuring object, a rotation detecting unit that detects rotations of the two rotors, respectively, and a stroke position detecting unit that detects the stroke position of the measuring object based on the rotations of the two rotors detected by the rotation detecting unit. At least one of the two rotors is in direct contact with the measuring object. The two rotors are provided side by side in an arrangement direction perpendicular to an axial direction of the measuring object and are provided so as to be adjacent to the measuring object in an arrangement perpendicular direction perpendicular to the axial direction and the arrangement direction. Each of the two rotors is provided in such a manner that its rotation axis direction is inclined with respect to the arrangement direction.

12 Claims, 8 Drawing Sheets

STROKE SENSOR

CROSS-REFERENCE TO RELATED APPLICATION

The present patent application claims the priority of Japanese patent application No. 2021-187359 filed on Nov. 17, 2021, and the entire contents thereof are hereby incorporated by reference.

TECHNICAL FIELD

The present invention relates to a stroke sensor.

BACKGROUND ART

In recent years, the application of steer-by-wire to vehicles is progressing. In the steer-by-wire, unlike the conventional steering mechanism, steered wheels and a steering mechanism are not mechanically connected, while the steered wheels and the steering mechanism are electrically connected. Therefore, the application of steer-by-wire is characterized in that the degree of freedom in the design of the interior of the vehicle can be increased, the weight of the steering mechanism can be reduced, and the steered wheels would not directly receive the road surface reaction force from the wheels.

In addition, there exists Patent Literature 1 as prior art document information relevant to the invention of this application.

CITATION LIST

Patent Literature

Patent Literature 1: WO2021/210125

SUMMARY OF THE INVENTION

The above steer-by-wire requires highly accurate control in order to reproduce the fine steering and turning that humans have performed, and it is required to acquire a turning angle (i.e., a steering angle) with high accuracy. In order to obtain the turning angle with high accuracy, it is required to obtain the displacement (i.e., a stroke position) of a rack shaft in an axial direction with high accuracy. That is, there is a demand for a stroke sensor that can detect the stroke position of the rack shaft with high accuracy.

Also, the stroke sensor is housed inside a housing that houses the rack shaft. The space inside the housing that can accommodate the stroke sensor is limited, and a compact stroke sensor is required.

Accordingly, it is an object of the present invention to provide a compact stroke sensor capable of detecting a stroke position with high accuracy.

To solve the aforementioned problems, one aspect of the present invention provides a stroke sensor configured to detect a stroke position of a rod-shaped measuring object that strokes in an axial direction, comprising:
two disk-shaped rotors configured to rotate along with a stroke of the measuring object;
a rotation detecting unit configured to detect rotations of the two rotors, respectively; and
a stroke position detecting unit configured to detect the stroke position of the measuring object based on the rotations of the two rotors detected by the rotation detecting unit,
wherein at least one of the two rotors is provided in direct contact with the measuring object,
wherein the two rotors are provided side by side in an arrangement direction perpendicular to an axial direction of the measuring object and are provided so as to be adjacent to the measuring object in an arrangement perpendicular direction perpendicular to the axial direction and the arrangement direction,
wherein each of the two rotors is provided in such a manner that a rotation axis direction of each of the two rotors is inclined with respect to the arrangement direction.

Effects of the Invention

According to the present invention, it is possible to provide a compact stroke sensor capable of detecting a stroke position with high accuracy.

BEST MODE FOR CARRYING OUT THE INVENTION

Embodiments

Embodiments of the present invention will be described below with reference to the accompanying drawings.

(Steering Device 10)

Figure 1A:
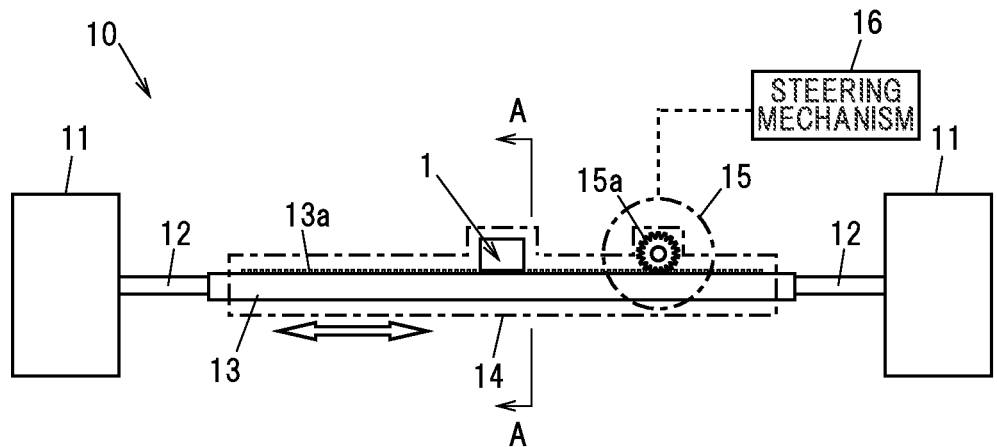
FIG. 1A is a schematic diagram of a steering device equipped with a stroke sensor according to the present embodiment.
Figure 1B:
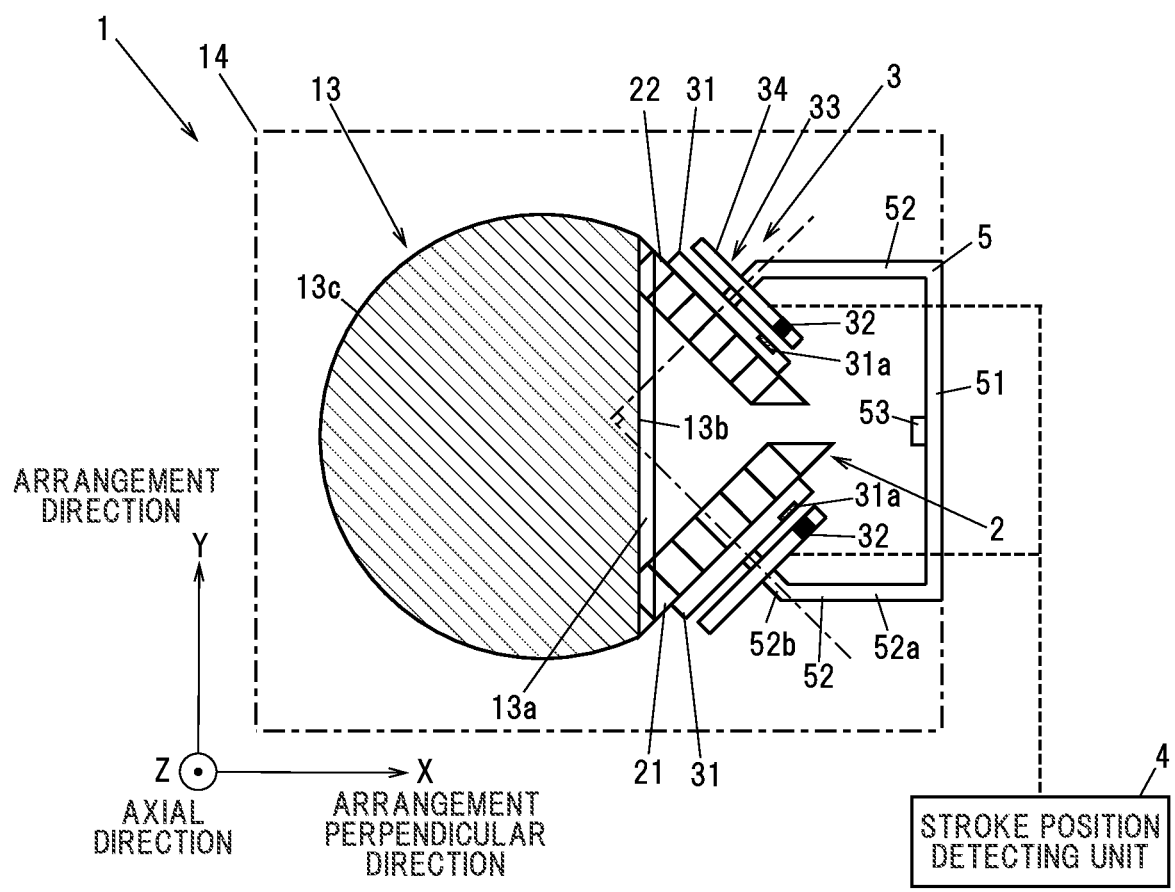
FIG. 1B is a cross-sectional view of the stroke sensor in FIG. 1A taken along a line A-A.

FIG. 1A is a schematic diagram of a steering device 10 equipped with a stroke sensor 1 according to the present embodiment, and FIG. 1B is a cross-sectional view thereof taken along a line A-A.

As shown in FIG. 1A, the steering device 10 includes a tie rod 12 connected to a rolling wheel 11 (such as a front wheel of a vehicle), a rack shaft 13 connected to the tie rod 12, a housing 14 that houses the rack shaft 13, a motor 15 for driving the rack shaft 13, and a steering mechanism 16 including steering wheels and the like. In this steering device 10, the motor 15 is driven in accordance with the steering operation by the steering mechanism 16, and the rack shaft 13 is stroked in an axial direction (i.e., a horizontal direction in the drawing), thereby rolling the rolling wheel 11 to perform the steering operation. The rack shaft 13 has a toothed portion (rack) 13a in which teeth are formed at equal intervals along the axial direction, and a pinion 15a driven by the motor 15 meshes with the toothed portion 13a so that a rack and pinion mechanism is configured.

As shown in FIG. 1B, the rack shaft 13 has a partially notched shape in a cross-section perpendicular to the axial direction, and its outer peripheral surface is composed of a linear portion 13b and an arc portion 13c. The toothed portion 13a is formed on a flat portion of an outer peripheral surface of the rack shaft 13 corresponding to the linear portion 13b. The rack shaft 13 is a member whose stroke position is to be detected by the stroke sensor 1 according to the present embodiment, and corresponds to a member to be measured (i.e., measuring object) in the present invention.

(Stroke Sensor 1)

The stroke sensor 1 is a sensor that detects the stroke position (displacement) of the rack shaft 13 as a rod-shaped measuring object which strokes in the axial direction. The stroke sensor 1 includes two rotors (i.e., rotating bodies) 2, a rotation detector (i.e., rotation detecting unit) 3, a stroke position detector (i.e., stroke position detecting unit) 4, and a support member 5.

(Rotor 2)

The rotor 2 is a member that rotates along with the stroke of the rack shaft 13, which is the measuring object and is formed in a disc shape. In the present embodiment, two rotors 2 composed of a first rotor 21, and a second rotor 22 are used. The stroke sensor 1 converts the stroke of the rack shaft 13 into the rotations of the first and second rotors 21 and 22, and detects the stroke position of the rack shaft 13 based on the rotations of the first and second rotors 21 and 22.

The first and second rotors 21 and 22 are provided in such a manner that their rotation axes are perpendicular to the stroke direction, that is, the axial direction of the rack shaft 13, so as to rotate along with the stroke of the rack shaft 13.

In the stroke sensor 1, at least one of the two rotors 2 is provided in direct contact with the rack shaft 13 in order to detect the stroke position of the rack shaft 13 with high accuracy. In the present embodiment, both the first and second rotors 21 and 22 are in direct contact with the rack shaft 13.

More specifically, in the present embodiment, both the first and second rotors 21 and 22 are gears that directly mesh with the toothed portion 13a of the rack shaft 13. As described above, the toothed portion 13a of the rack shaft 13 is used to stroke the rack shaft 13 by the motor 15. In the present embodiment, the toothed portion 13a is also used to detect the stroke position.

In the stroke sensor 1 according to the present embodiment, the two rotors 21 and 22 are arranged side by side in the arrangement direction perpendicular to the axial direction of the rack shaft 13 and arranged adjacent to the rack shaft 13 in the arrangement perpendicular direction, which is perpendicular to the axial direction and the arrangement direction. When viewed from the axial direction, each of the two rotors 21 and 22 is provided in such a manner that the direction of its rotation axis is inclined with respect to the arrangement direction.

When defining an orthogonal coordinate system consisting of the X-, Y-, and Z-axes, the Z-axis direction corresponds to the "axis direction", the Y-axis direction to the "arrangement direction", and the X-axis direction to the "arrangement perpendicular direction". That is, in the stroke sensor 1, when the axial direction of the rack shaft 13 is the Z-axis direction, both rotors 21 and 22 are arranged side by side in the Y-axis direction, both rotors 21 and 22 and the rack shaft 13 are adjacent to each other in the Y-axis direction, and the rotation axis directions of both rotors 21 and 22 are inclined with respect to the Y-axis direction.

As a result, it is possible to suppress the rotors 21 and 22 from projecting radially outward with respect to the rack shaft 13, and to reduce the size of the stroke sensor 1 as a whole. Although the space in the housing 14 of the steering device 10 is very small, even in such a limited space in the housing 14, the small-sized steering device 10 that can be compactly accommodated on one side of the rack shaft 13 can be achieved.

Since both rotors 21 and 22 are inclined with respect to the toothed portion 13a of the rack shaft 13, it is preferable to use bevel gears each having a conical toothed surface as the rotors 21 and 22.

In the present embodiment, both rotors 21 and 22 are arranged in such a manner that their rotation axes intersect each other. Although the details will be described later, in the present embodiment, the rotations of the rotors 21 and 22 are detected using magnetism. Therefore, so as to avoid the interference of magnetism, both rotors 21 and 22 are arranged in such a manner that their rotation axes are orthogonal to each other (straight lines along the rotation axes are orthogonal to each other). The details of this point will be described later. However, a slight error in the angle formed by the rotation axes of both rotors 21 and 22 is allowed. Specifically, the angle formed by the rotation axes of both rotors 21 and 22 should be 80° or more and 100° or less.

Both rotors 21 and 22 are arranged in such a manner that their rotation axes are at the same position in the axial direction (X-axis direction) of the rack shaft 13 (namely, in such a manner that the rotation axes are aligned in the Y-axis direction). Further, the angles at which the rotation axes are inclined with respect to the arrangement direction (Y-axis direction) of both rotors 21 and 22 are the same angle (45°). Furthermore, when viewed from the axial direction of the rack shaft 13, the rotors 21 and 22 are arranged to be inclined in such a manner that a distance between the rotor 21 and the rotor 22 gradually increases from a radially outer side to a radially inner side of the rack shaft 13. Both rotors 21 and 22 are rotatably supported by the support member 5. Details of the support member 5 will be described later.

Furthermore, in the present embodiment, the outer diameters (numbers of teeth) of the first rotor 21 and the second rotor 22 are made different from each other. Here, the outer diameter (number of teeth) of the first rotor 21 is larger than the outer diameter (number of teeth) of the second rotor 22. The reason for this will be described later.

(Rotation Detector 3)

The rotation detector 3 detects rotations of the two rotors 21 and 22, respectively. The rotation detector 3 has two rotor-side boards (i.e., rotary substrates) 31, two detection coils 32, and two detection circuits 33.

The rotor-side boards 31 are integrally provided on end faces of the two rotors 21 and 22 in the rotation axis directions, respectively, and rotate together with the rotations of the corresponding rotors 21 and 22. In the present embodiment, the disk-shaped rotor-side boards 31 are provided integrally with the rotors 21 and 22, respectively, so as to be coaxial with the rotors 21 and 22 on the end faces of the rotors 21 and 22 in the rotation axis direction opposite to the rack shaft 13. The rotor-side boards 31 are formed smaller in outer diameter than the corresponding rotors 21 and 22, respectively (more specifically, smaller in outer diameter than the bottoms of the teeth).

Figure 2:
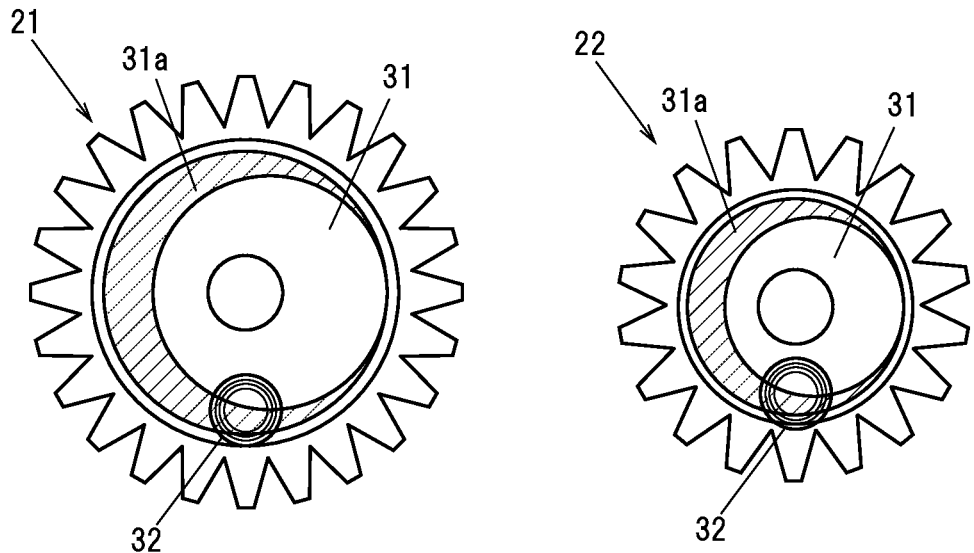
FIG. 2 is a plan view of a rotor and a rotor-side board.

As shown in FIG. 2, each of the rotor-side boards 31 has a conductor pattern 31a formed in a predetermined pattern along a circumferential direction of each of the rotors 21 and 22. In the illustrated examples, the conductor pattern 31a is formed in such a manner that the thickness along the radial direction of each of the rotors 21 and 22 gradually changes along the circumferential direction of each of the rotors 21 and 22. The conductor pattern 31a is formed in such a manner that the thickest portion and the thinnest portion face each other in the radial direction. In the present embodiment, since the outer diameters (numbers of teeth) of the first rotor 21 and the second rotor 22 are different from each other, the sizes of the rotor-side boards 31 and the conductor patterns 31a are also different from each other accordingly. However, the pattern structure itself of the conductor pattern 31a has the same pattern structure in the circumferential direction of each of the rotors 21 and 22.

The two detection coils 32 are provided so as to face the corresponding rotor-side boards 31, respectively. Both detection coils 32 are fixed so as not to rotate along with the rotations of the rotors 21 and 22. When an AC voltage is applied to the detection coil 32, an eddy current is generated in the conductor pattern 31a facing the detection coil 32 due to the magnetic field generated by the detection coil 32. The inductance of the detection coil 32 changes due to the magnetic field generated by the eddy current generated in the conductor pattern 31a. Since the change in the inductance of the detection coil 32 changes depending on the shape of the conductor pattern 31a (here, the thickness along the radial direction of each of the rotors 21 and 22), each of the rotation angles of the corresponding rotors 21 and 22 can be detected based on the change in the inductance of the detection coil 32.

Each of the detection coils 32 is arranged in such a manner that the direction of the magnetic field generated by the detection coil 32 (magnetic field generation direction) is parallel to each of the rotation axes of the rotors 21 and 22. Furthermore, in the present embodiment, the two detection coils 32 are arranged in such a manner that their magnetic field generation directions are orthogonal to each other (thus, the rotation axes of the rotors 21 and 22 parallel to the magnetic field generation directions of both detection coils 32 are also orthogonal to each other). As a result, it becomes possible to suppress the influence of the magnetic field generated by the detection coil 32 corresponding to one rotor 2 (for example, the first rotor 21) on the detection coil 32 corresponding to the other rotor 2 (for example, the second rotor 22), thereby improving the detection accuracy. In the present embodiment, one detection coil 32 is provided for each of the rotors 21 and 22, but two or more detecting coils 32 may be provided for each of the rotors 21 and 22. That is, the number of detection coils 32 provided for each of the rotors 21 and 22 is preferably one or more.

Each of the detection circuits 33 is a circuit that detects the rotation angle of each of the corresponding rotors 21 and 22 based on changes in the inductance of both detection coils 32 when AC voltage is applied to each of the detection coils 32. In the present embodiment, the detection circuit 33 is configured to detect changes in the inductance of the detection coil 32 based on changes in the resonance frequency.

Figure 3:
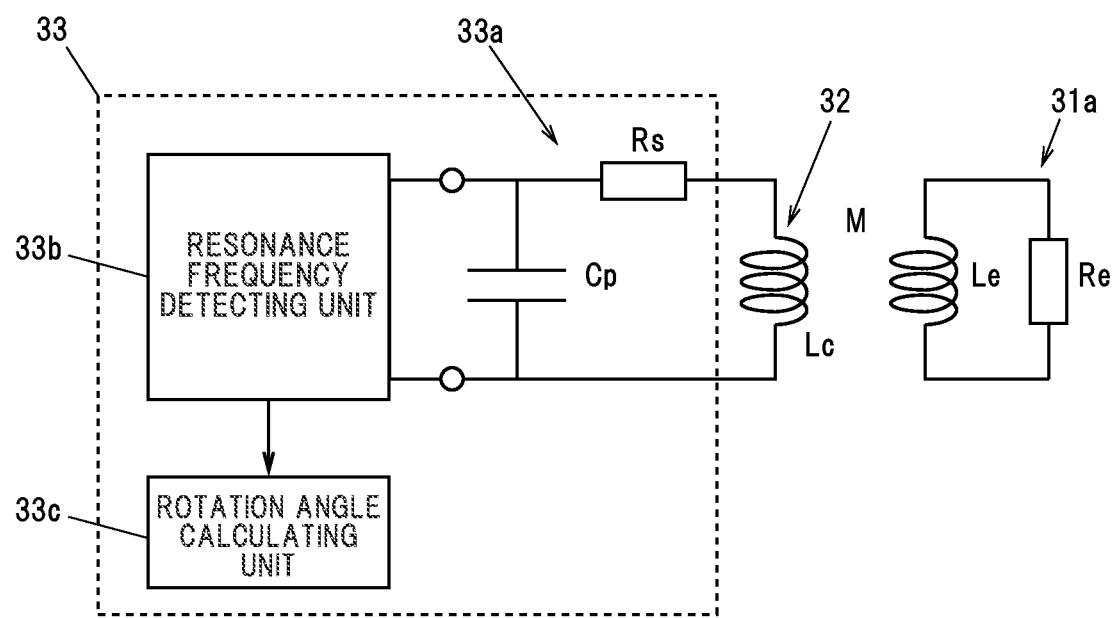
FIG. 3 is a circuitry diagram showing an example of a detection circuit.

FIG. 3 is a circuitry diagram showing an example of the detection circuit 33. As shown in FIG. 3, $L_e$ is the inductance of the detection coil 32, $L_e$ is the inductance generated in the conductor pattern 31a, $R_e$ is the resistance of the conductor pattern 31a, and M is the mutual inductance between the detection coil 32 and the conductor pattern 31a.

The detection circuit 33 includes a resistor $R_s$ connected in series with the detection coil 32, a capacitive element $C_p$ connected in parallel to the detection coil 32 and the resistor $R_s$ connected in series, a resonance frequency detector (i.e., resonance frequency detecting unit) 33b for detecting the resonance frequency of a resonance circuit 33a composed of the detection coil 32, the resistor $R_s$, and the capacitive element $C_p$, a rotation angle calculator (i.e., rotation angle calculating unit) 33c for obtaining rotation angles of the rotors 21 and 22 based on the resonance frequency detected by the resonance frequency detector 33b.

In the circuit shown in FIG. 3, the resonance frequency $f_0$ of the resonance circuit 33a detected by the resonance frequency detector 33b of the detection circuit 33 can be expressed by the following formula.

$$f_0 \cong \frac{1}{2\pi} \left\{ \frac{1}{\left(L_c - \frac{M^2}{L_G}\right)C_p} \left\{ 1 - \frac{\left(R_s + \frac{M^2}{L_e^2}R_e\right)^2 C_p}{L_c - \frac{M^2}{L_e}} \right\} \right\}^{\frac{1}{2}}$$ [Formula 1]

The rotation angle calculator 33c detects a change in the inductance Lc of the detection coil 32 according to the influence of the conductor pattern 31a facing the detection coil 32 based on the resonance frequency $f_0$ detected by the resonance frequency detector 33b, to obtain the rotation angles of the rotors 21 and 22, respectively.

As shown in FIG. 1B, the detection circuit 33 and the detection coil 32 are mounted on a fixed-side (i.e., stationery) circuit board 34. The fixed-side circuit board 34 is provided facing the rotor-side board 31 and fixed to the housing 14 via the support member 5.

(Stroke Position Detector 4)

The stroke position detector 4 calculates the stroke position of the rack shaft 13 based on the rotations (rotational angles) of the two rotors 21 and 22 detected by the detection circuit 33. The stroke position detecting unit 4 is realized by appropriately combining an arithmetic element such as a CPU, a memory, software, an interface, and the like.

As described above, in the present embodiment, the outer diameters (the numbers of teeth) of the two rotors 21 and 22 are different from each other, and the rotation angles of the two rotors 21 and 22 when the rack shaft 13 is stroked are configured differently from each other. Therefore, it is possible to detect the stroke position with high accuracy based on the rotation angles of these two rotors 21 and 22. Further, by appropriately differentiating a detection period (i.e., detection cycle) of each of the rotors 21 and 22 (i.e., a rotation cycle of the conductor pattern 31a corresponding to the number of teeth of each of the rotors 21 and 22), the stroke position can be detected even with a longer stroke length than the length of the outer periphery of each of the rotors 21 and 22. Therefore, for example, even if relatively small rotors 21 and 22 are used, the stroke position of the rack shaft 13 can be accurately detected.

The stroke position detector 4 may be mounted, for example, on an electronic control unit of a vehicle. In this case, the fixed-side circuit board 34 on which the detection circuit 33 is mounted and the electronic control unit are appropriately connected by a cable or the like. Alternatively, the stroke position detector 4 may be configured separately from the electronic control unit of the vehicle and may be configured to output the detected stroke position of the rack shaft 13 to the electronic control unit. For example, the stroke position detector 4 may be mounted on the fixed-side circuit board 34 or may constitute a dedicated unit separate from the electronic control unit.

(Support Member 5)

The support member 5 is for supporting the rotors 21 and 22 and the fixed-side circuit board 34 and is preferably made of a non-magnetic material such as resin. The support member 5 integrally has a linear fixed portion 51 fixed to the housing 14 of the steering device 10 and a pair of arm portions 52 extending from both ends of the fixed portion 51 toward the rack shaft 13.

The fixed portion 51 is fixed to the housing 14 by a fixing member 53 such as a bolt. Each arm portion 52 has a parallel portion 52a that extends vertically from the fixed portion 51, and an inclined portion 52b that extends at an angle inward (toward the opposing arm portion 52) from a distal end portion (i.e., tip portion) of the parallel portion 52a. Each of the rotors 21 and 22, which are bevel gears, is attached to a distal end portion (i.e., tip portion) of the inclined portion 52b so as to be rotatable with respect to the inclined portion 52b. The fixed-side circuit board 34 is fixed to the inclined portion 52b closer to the parallel portion 52a than each of the rotors 21 and 22.

Figure 4:
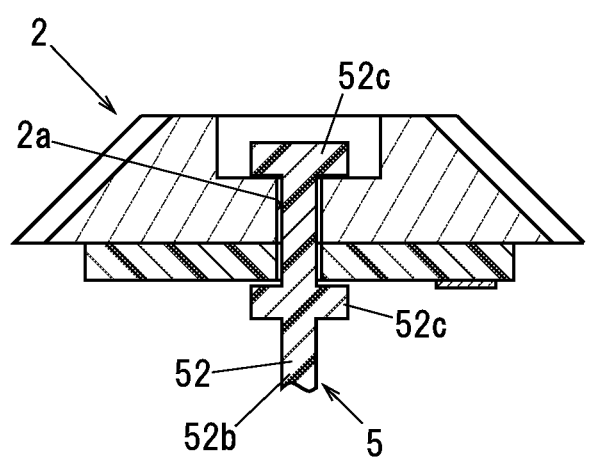
FIG. 4 is a diagram showing an example of a support structure for the rotor using a support member.

FIG. 4 is a diagram showing an example of a support structure for the rotor 2 by the support member 5. As shown in FIG. 4, the distal end portion of the arm portion 52 of the support member 5 is inserted through a through-hole 2a formed in the center of the rotor 2, and a pair of flanges 52c, 52c are formed so as to sandwich the through-hole 2a. The rotor 2 is rotatably supported by the support member 5 by the pair of flanges 52c, 52c interfering with the support member 5 on the periphery of the through-hole 2a. The specific shape of the support member 5 is not limited to the illustrated one, and can be changed as appropriate according to the arrangement of each member, the shape of the housing 14, and the like. In other words, the support member 5 should at least rotatably support the rotors 21 and 22, support the fixed-side circuit board 34, and be fixed to the housing 14. Furthermore, the support member 5 that supports the rotors 21 and 22 and the support member 5 that supports the fixed-side circuit board 34 may be configured separately.

Modified Examples

Figure 5A:
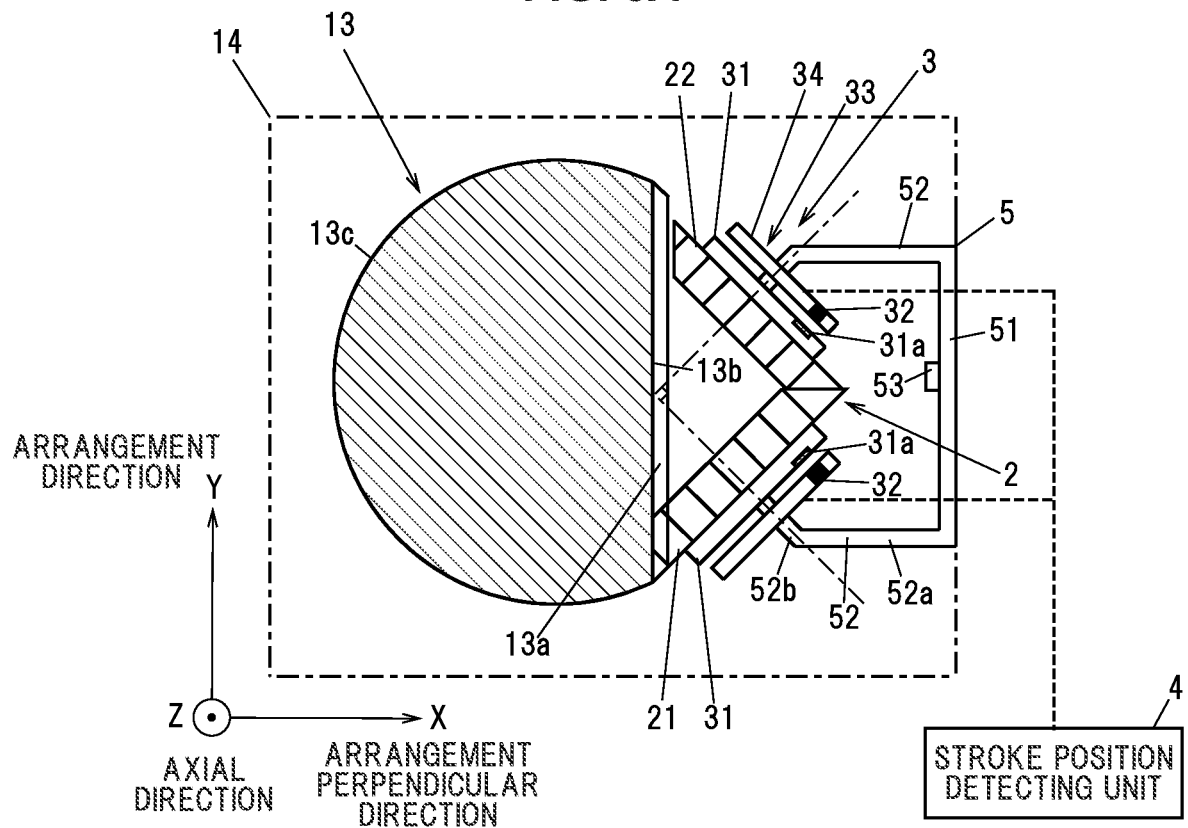
FIGS. 5A and 5B are schematic diagrams showing modified examples of the stroke sensor shown in FIG. 1B.

In the present embodiment, both the first and second rotors 21 and 22 are gears that directly mesh with the toothed portion 13a of the rack shaft 13. However, the present invention is not limited thereto, and at least one of the first and second rotors 21 and 22 should be a gear that directly meshes with the toothed portion 13a of the rack shaft 13. For example, as shown in FIG. 5A, one rotor 2 (here, the first rotor 21) may be composed of a gear that directly meshes with the toothed portion 13a, and the other rotor 2 (here, the second rotor 22) may be composed of a gear that meshes with one rotor 2 (here, the first rotor 21). Even though it is possible to interpose one or more gears between the first rotor 21 and the second rotor 22, for example, such a configuration is not preferable, since it may lead to an increase in cost and increase the likelihood of failures.

Figure 5B:
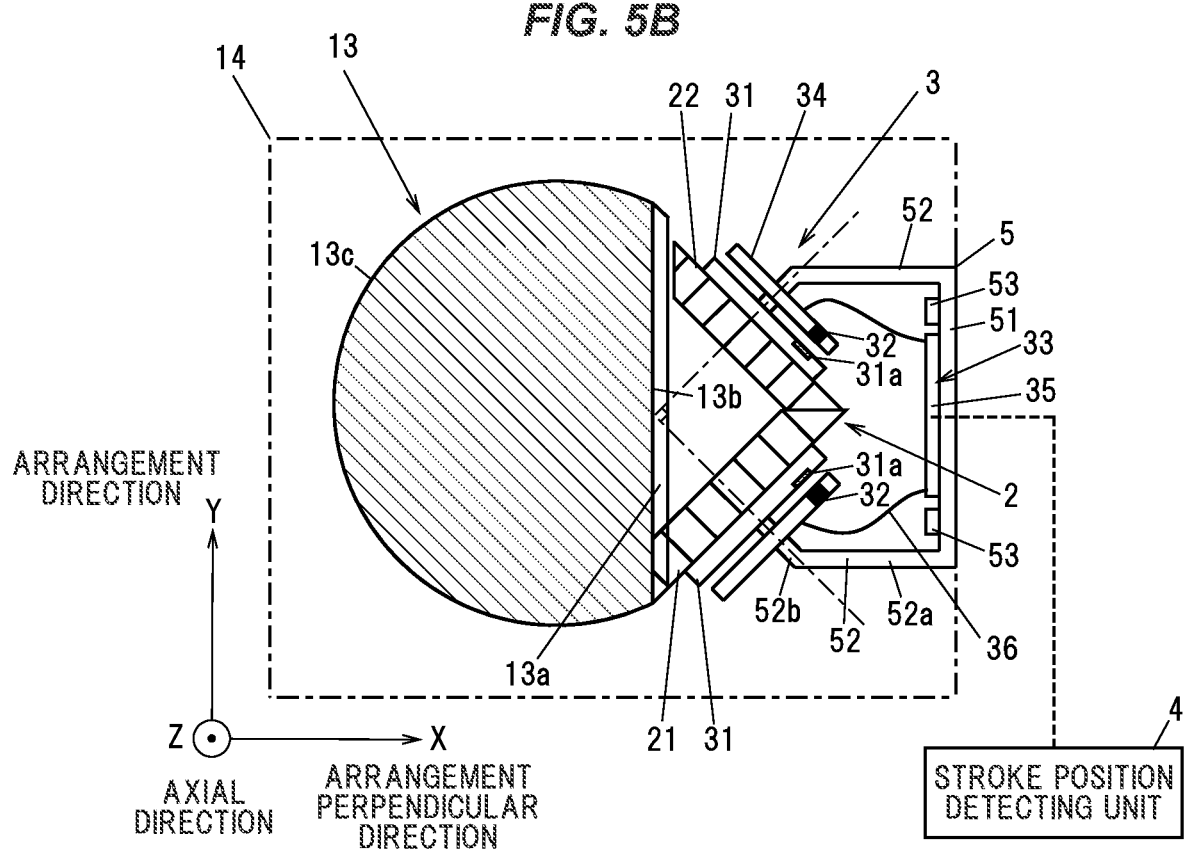

Furthermore, as shown in FIG. 5B, it may be configured that only the detection coil 32 is provided on the fixed-side circuit board 34, and the detection circuit 33 is collectively mounted on a common board 35 provided separately from the fixed-side circuit board 34. The fixed-side circuit board 34 and the common board 35 are electrically connected by a wire 36. In this case, the detection circuit 33 may be partially mounted on the fixed-side circuit board 34.

Figure 6A:
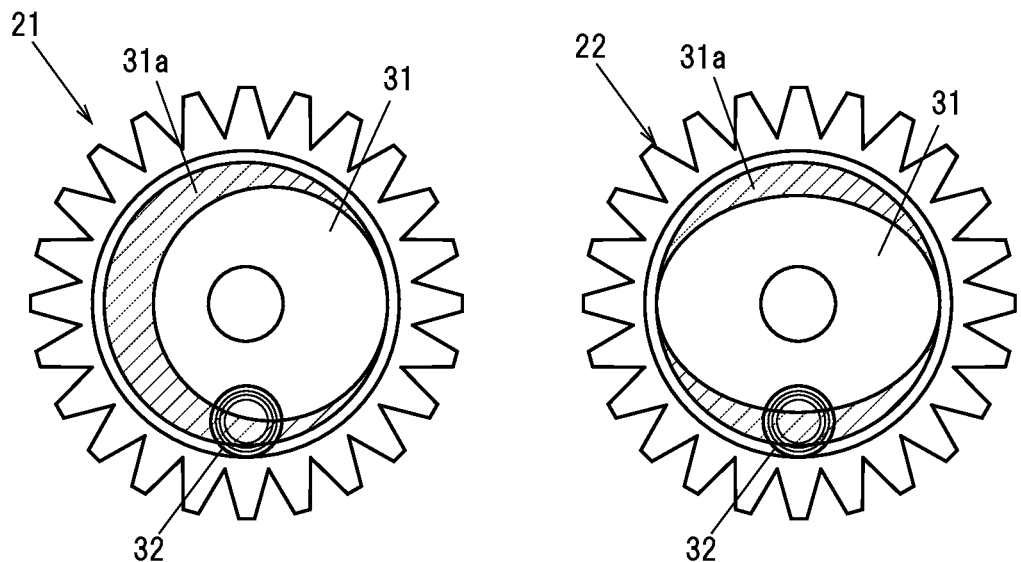
FIGS. 6A and 6B are plan views showing modified examples of the rotor and its conductor pattern.

Further, in the present embodiment, the two rotors 21 and 22 have different outer diameters (numbers of teeth), but the present invention is not limited thereto. As shown in FIG. 6A, the outer diameters (numbers of teeth) of the two rotors 21 and 22 may be the same. In other words, the two rotors 21 and 22 may be configured in such a manner that they rotate at the same angle when the rack shaft 13 is stroked. In this case, the conductor patterns 31a, 31a corresponding to the two rotors 21 and 22 are preferably designed to have different pattern configurations in the circumferential directions of the rotors 21 and 22 in such a manner that the two rotors 21 and 22 have different detection cycles. In the illustrated example, on one rotor 2 (first rotor 21), the conductor pattern 31a has one thickest position and one thinnest position at intervals of 180°. On the other rotor 2 (second rotor 22), the thickest positions and the thinnest positions are alternately formed every 90°. As a result, an effect equivalent to that obtained when the outer diameters (numbers of teeth) of the two rotors 21 and 22 are different can be obtained.

Figure 6B:
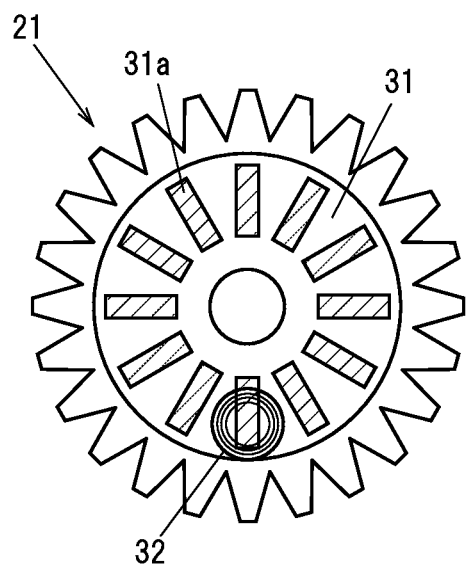

Furthermore, in the present embodiment, the thickness of the conductor pattern 31a is gradually changed along the circumferential direction of the rotor 2. However, the configuration of the conductor pattern 31a is not limited thereto. As shown in FIG. 6B, the conductor pattern 31a may be configured to have a constant thickness and be formed at predetermined intervals in the circumferential direction of the rotor 2.

Figure 7:
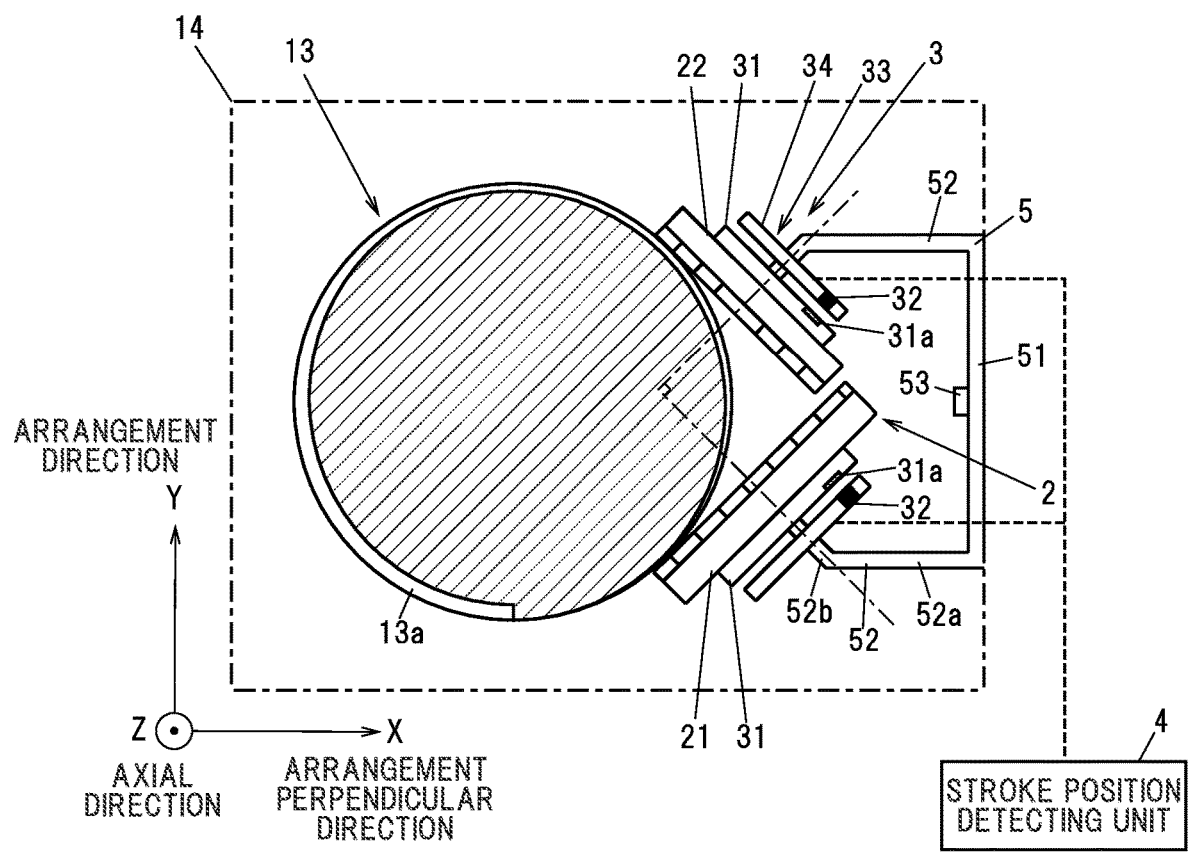
FIG. 7 is a schematic diagram showing a modified example of the stroke sensor of FIG. 1B.

Further, in the present embodiment, the case where a part of the rack shaft 13 is cut (notched) and the toothed portion 13a is formed therein is described. However, as shown in FIG. 7, a cross-sectional shape perpendicular to the axial direction of the rack shaft 13 may be circular, and a toothed portion 13a having spiral teeth may be formed on the outer peripheral surface thereof. In this case, crown gears may be used as the two rotors 21 and 22.

Functions and Effects of the Embodiment

As described above, the stroke sensor 1 according to the present embodiment comprises the two disk-shaped rotors 2 that rotate along with the stroke of the rack shaft 13, which is the measuring object, the rotation detector 3 that detects the rotations of the two rotors 2 respectively, the stroke position detector 4 that detects the stroke position of the rack shaft 13 as the measuring object, based on the rotations of the two rotors 2 detected by the rotation detector 3, in which at least one of the two rotors 2 is provided in direct contact with the rack shaft 13 as the measuring object, the two rotors 2 are arranged side by side in the arrangement direction perpendicular to the axial direction of the rack shaft 13 as the measuring object and arranged to be adjacent to the rack shaft 13 as the measuring object in the arrangement perpendicular direction which is perpendicular to the axial direction and the arrangement direction, and when viewed from the axial direction, each of the two rotors 2 is provided in such a manner that the rotation axis direction is inclined with respect to the arrangement direction.

By detecting the stroke position using the two rotors 2, detection accuracy can be improved. Further, by providing the two rotors 2 to be inclined with respect to the arrangement direction (i.e., obliquely), the rotors 21, 22 are suppressed from protruding radially outward with respect to the rack shaft 13, and the entire stroke sensor 1 can be miniaturized. That is, according to the present embodiment, it is possible to realize a compact stroke sensor 1 capable of detecting a stroke position with high accuracy. Further, in the stroke sensor 1, at least one of the rotors 2 is brought into direct contact with the rack shaft 13, and the stroke (displacement) of the rack shaft 13 is directly obtained so the stroke position can be detected with high precision.

Further, in the present embodiment, the rotation of the rotor 2 is detected by a method using magnetism by the detection coil 32 and the conductor pattern 31*a*. Therefore, the stroke position can be accurately detected without being affected by grease or the like in the housing 14 of the steering device 10.

Another Embodiment

Figure 8:
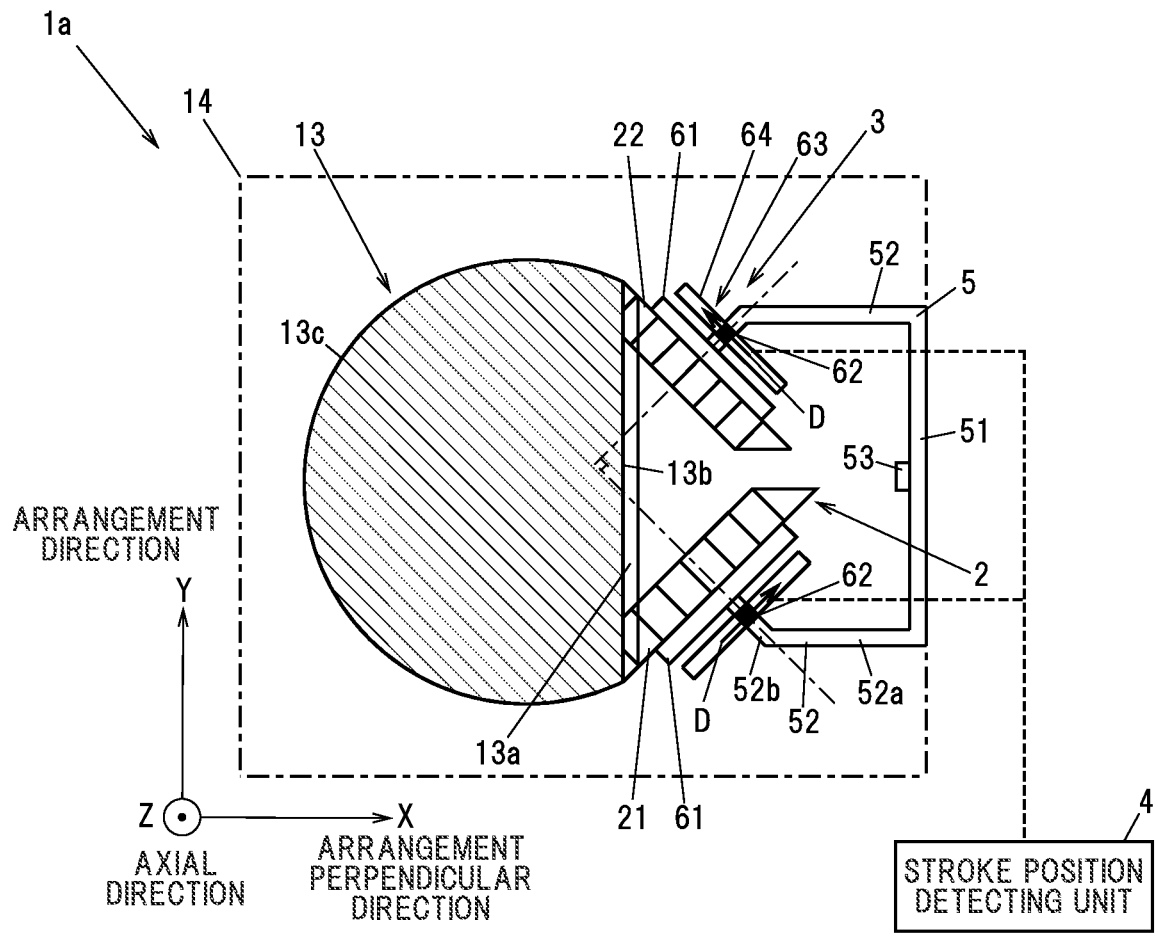
FIG. 8 is a schematic diagram showing a stroke sensor according to another embodiment of the present invention.

The stroke sensor 1*a* shown in FIG. 8 has basically the same configuration as the stroke sensor 1 shown in FIG. 1B, except the configuration of the rotation detector 3. In the stroke sensor 1*a*, the rotation detector 3 includes two magnets 61 integrally provided with the two rotors 21 and 22, respectively, and magnetic detection elements 62, each of which is provided so as not to rotate along with the rotation of the corresponding one of the rotors 21 and 22 and configured to detect the magnetic field from the corresponding one of the two magnets 61, and detection circuits 63, each of which detects the rotation angle of the corresponding one of the rotors 21 and 22 based on the detection result of the corresponding one of the magnetic detection elements 62.

Figure 9:
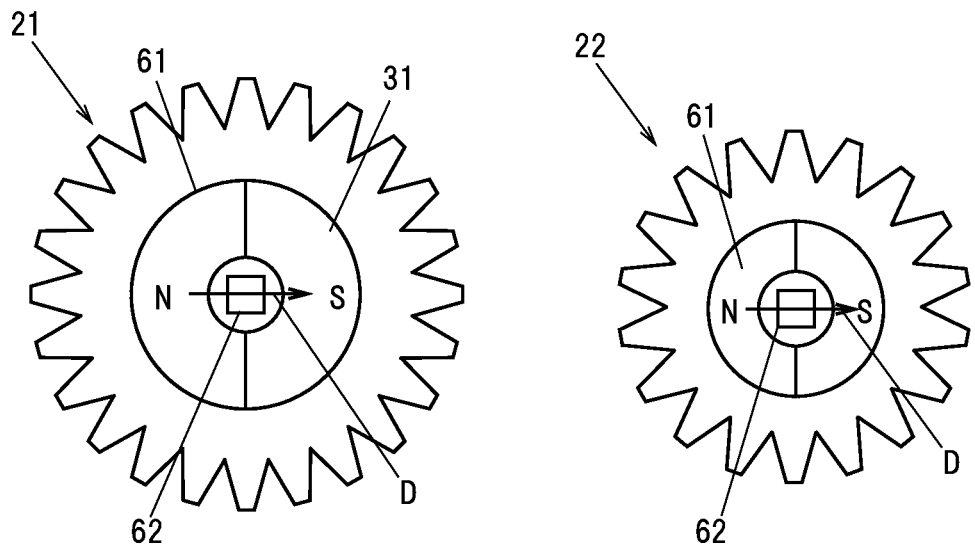
FIG. 9 is a plan view of a rotor and a rotor-side board.

The magnets 61 are provided integrally with the axial end faces of the corresponding rotors 21 and 22 and rotate together with the rotors 21 and 22, respectively. As shown in FIG. 9, in the present embodiment, a columnar (disk-shaped) magnet 61 having N and S poles formed along the circumferential direction of each of the rotors 21 and 22 is provided. In addition, the shape of the magnet 61 is not limited to that shown in the drawing, and the magnet 61 may be, for example, a rod-like shape. Alternatively, the magnet 61 may be a ring-shaped magnet in which a plurality of N poles and a plurality of S poles are formed along the circumferential direction of each of the rotors 21 and 22.

The two magnetic detection elements 62 are used corresponding to the two rotors 21 and 22 in the stroke sensor 1*a*. Both magnetic detection elements 62 are arranged so as to face the axial end faces of the corresponding rotors 21 and 22 (the axial end faces on the side where the magnets 61 are provided), and detect the magnetic field (magnetic field intensity) from the corresponding magnets 61. A Hall element, for example, can be used as the magnetic detection element 62. The magnetic detection element 62 is mounted on a fixed-side board 64, and the fixed-side board 64 is fixed to the housing 14 via the support member 5. In FIGS. 8 and 9, the detection axis of the magnetic detection element 62 is denoted by D.

The two magnetic detection elements 62 are provided so as to detect magnetic fields perpendicular to the rotation axis directions of the corresponding rotors 21 and 22, respectively. The two rotors 21 and 22 are arranged in such a manner that their rotation axes are orthogonal to each other. That is, the two rotors 21 and 22 are arranged in such a manner that the magnetic field detection directions (detection axes D) are orthogonal to each other. As a result, it becomes possible to suppress the influence of the magnetic field generated by the magnet 61 corresponding to one rotor 2 (for example, the first rotor 21) on the magnetic detection element 62 corresponding to the other rotor 2 (for example, the second rotor 22), thereby improving the detection accuracy.

In the illustrated example, the magnetic detection element 62 is arranged at a position on the extension line of the rotation axis of each of the rotors 21 and 22 (i.e., a center position of each of the rotors 21 and 22 when viewed from the direction of the rotation axis). Arrangement of the magnetic detection element 62 may be difficult depending on the structure of the support member 5 or the like. In such a case, the magnetic detection element 62 may be arranged at a position slightly displaced from the position on the extension line of the rotation shaft of each of the rotors 21 and 22 (the center position of each of the rotors 21 and 22 when viewed from the direction of the rotation axis).

The detection circuit 63 detects the rotation angle of the corresponding one of the rotors 21 and 22 based on the magnetic field intensity detected by the magnetic detection element 62. The detection circuit 63 is mounted on the fixed-side board 64.

Functions and Effects of Another Embodiment

In the stroke sensor 1*a* of FIG. 8, the rotation of each of the rotors 21 and 22 is detected using the magnet 61 and the magnetic detection element 62 instead of the rotor-side board 31 and the detection coil 32 in the stroke sensor 1 of FIG. 1B. With such a configuration, the same effects as those of the stroke sensor 1 of FIG. 1B can be obtained. That is, according to the stroke sensor 1*a*, the size of the stroke sensor can be reduced and the stroke position can be detected with high accuracy. Further, the stroke position can be accurately detected without being affected by grease or the like in the housing 14.

Modified Example of Another Embodiment

Figure 10A:
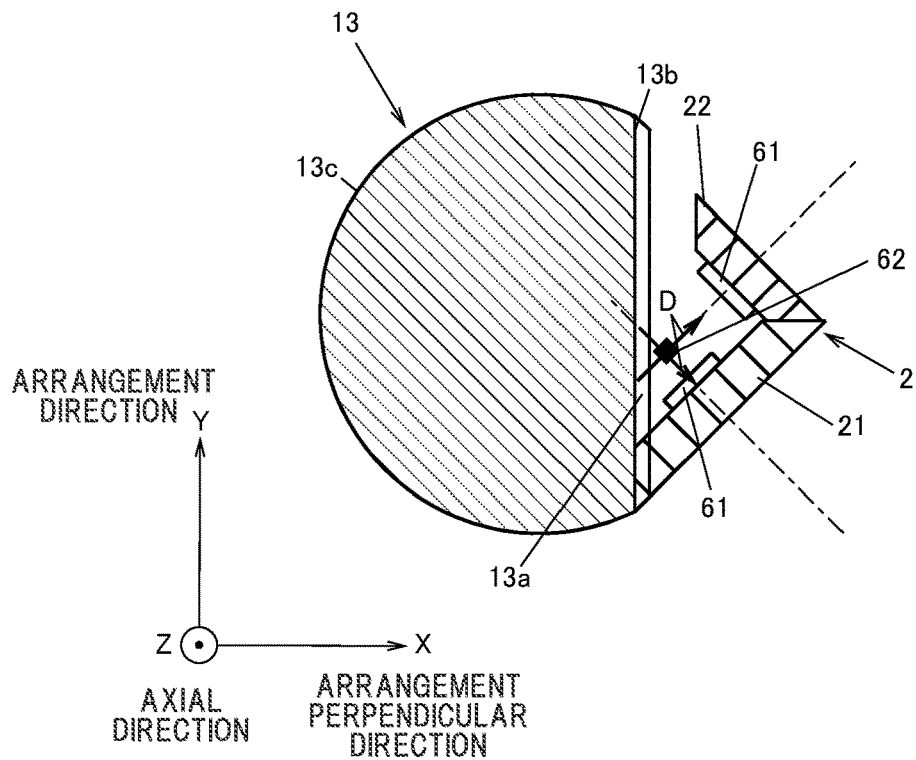
FIGS. 10A and 10B are schematic diagrams showing modified examples of the stroke sensor of FIG. 8.

FIG. 8 describes the case where two magnetic detection elements 62 are used, but a single biaxial magnetic detection element 62 may be used instead. For example, as shown in FIG. 10A, when the distance between the rotors 21 and 22 gradually increases as they approach the rack shaft 13, the axial end faces of the rotors 21 and 22 on the rack shaft 13-side are provided with the magnets 61 respectively, and the magnetic detection element 62 may be arranged at a position where the rotation axes of both rotors 21 and 22 intersect. The magnetic detection element 62 is preferably arranged in such a manner that the two detection axes D are perpendicular to the rotation axes of the rotors 21 and 22, respectively.

Figure 10B:
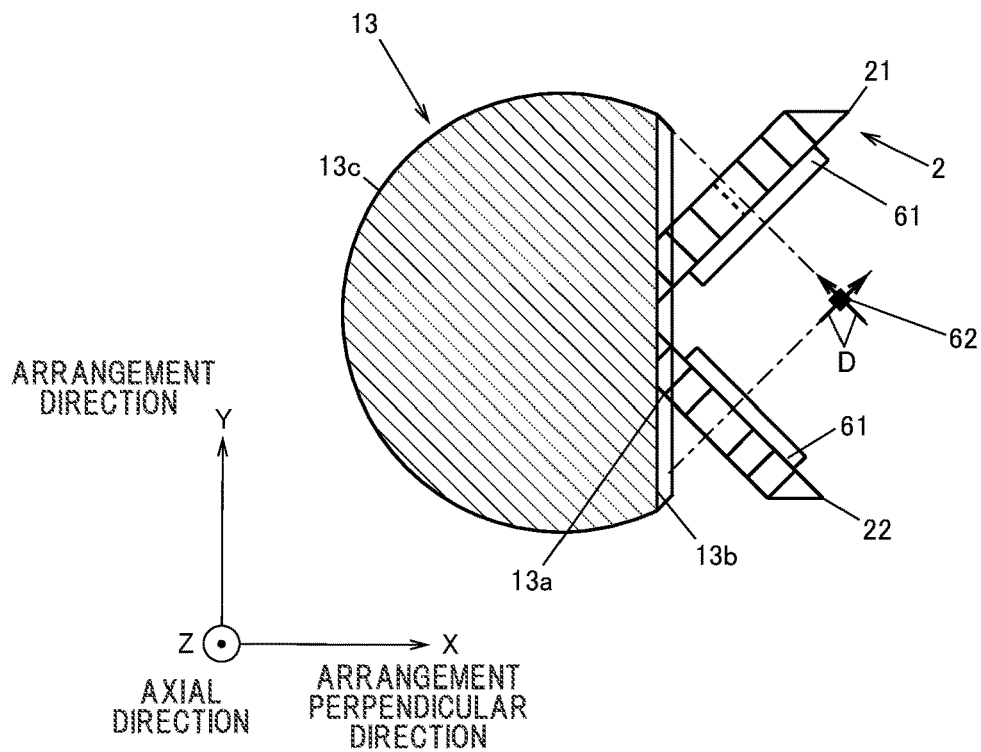

Further, as shown in FIG. 10B, it is also possible to dispose the rotors 21 and 22 in such a manner that the distance between the rotors 21 and 22 gradually increases as the distance from the rack shaft 13 increases. In this case, the magnets 61 is provided on each of the axial end faces of the rotors 21 and 22 on the side not facing the rack shaft 13, and the single magnetic detection element 62 is arranged at a position where the rotation axes of both the rotors 21 and 22 intersect. The magnetic detection element 62 is preferably arranged in such a manner that the two detection axes D are perpendicular to the rotation axes of the rotors 21 and 22, respectively.

Summary of Embodiment

Next, technical ideas understood from the embodiments described above will be described with reference to the reference numerals and the like in the embodiments. However, each reference numeral and the like in the following description do not limit the constituent elements in the claims to the members and the like specifically shown in the embodiment.

According to the feature [1], a stroke sensor configured to detect a stroke position of a rod-shaped measuring object 13 that strokes in an axial direction is composed of two disk-shaped rotors 2 configured to rotate along with a stroke of the measuring object, a rotation detecting unit 3 configured to detect rotations of the two rotors 2, respectively, and a stroke position detecting unit 4 configured to detect the stroke position of the measuring object 13 based on the rotations of the two rotors 2 detected by the rotation detecting unit 3, wherein at least one of the two rotors 2 is provided in direct contact with the measuring object 13, wherein the two rotors 2 are provided side by side in an arrangement direction perpendicular to an axial direction of the measuring object 13 and are provided so as to be adjacent to the measuring object 13 in an arrangement perpendicular direction perpendicular to the axial direction and the arrangement direction, wherein each of the two rotors 2 is provided in such a manner that a rotation axis direction of each of the two rotors 2 is inclined with respect to the arrangement direction.

According to the feature [2], in the stroke sensor 1 described in the feature [1], the rotation detecting unit 3 is composed of two rotor-side boards 31 each being provided integrally with an end face in the rotation axis direction of each of the two rotors 2 and having a conductor pattern 31a formed in a predetermined pattern along a circumferential direction of each of the rotors 2, two detection coils 32 provided so as to face the two rotor-side boards 31, respectively, and provided so as not to rotate along with the rotations of the rotors 2, and detection circuits 33, each being configured to detect a rotation angle of corresponding one of the rotors 2 based on a change in inductance of each of the detection coils 32 when an AC voltage is applied to each of the detection coils 32.

According to the feature [3], in the stroke sensor 1 described in feature [2], the two rotors 2 are arranged in such a manner that rotation axes of the two rotors 2 are orthogonal to each other, and the two detection coils 32 are arranged in such a manner that magnetic field generation directions in the two detection coils 32 when the AC voltage is applied are orthogonal to each other.

According to the feature [4], in the stroke sensor 1 described in the feature [2] or [3], the two rotors 2 are arranged in such a manner that the rotation angles of the two rotors 2 when the measuring object 13 is stroked are different from each other, and the conductor patterns 31a formed on the rotor-side boards 31 provided on the two rotors 2 are formed to have a same pattern configuration in respective circumferential directions of the rotors 2.

According to the feature [5], in the stroke sensor 1 described in the feature [2] or [3], the two rotors 2 are arranged in such a manner that the rotation angles of the two rotors 2 when the measuring object 13 is stroked are same, and the conductor patterns 31a formed on the rotor-side boards 31 provided on the two rotors 2 are formed to have pattern configurations different from each other in respective circumferential directions of the rotors 2.

According to the feature [6], in the stroke sensor 1a described in the feature [1], the rotation detecting unit 3 is composed of two magnets 61, each being integrally provided with each of the two rotors 2, a magnetic detection element 62 being provided so as not to rotate along with the rotors 2 and configured to detect magnetic fields from the two magnets 61, and detection circuits 63, each being configured to detect a rotation angle of a corresponding one of the rotors 2 based on a detection result of a corresponding one of the magnetic detection elements 62.

According to the feature [7], in the stroke sensor 1a described in the feature [6], the two rotors 2 are arranged in such a manner that rotation axes of the two rotors 2 are orthogonal to each other, and the magnetic detection element 62 comprises two magnetic detection elements 62 being arranged in such a manner that magnetic field detection directions of the two magnetic detection elements 62 being orthogonal to each other, and each of the two magnetic detection elements 62 is configured to detect a magnetic field of a corresponding one of the two magnets 61.

According to the feature [8], in the stroke sensor 1a described in the feature [6], the two rotors 2 are arranged in such a manner that rotation axes of the two rotors 2 are orthogonal to each other, and the magnetic detection element 62 is configured to detect magnetic fields in two directions orthogonal to each other and detect the magnetic fields of the two magnets 61 in the two directions.

According to the feature [9], in the stroke sensor 1a described in any one of features [6] to [8], the two magnets 61 have a same configuration, and the two rotors 2 are configured in such a manner that rotation angles of the two rotors 2 when the measuring object 13 is stroked are different from each other.

According to the feature [10], in the stroke sensor 1, 1a described in any one of the features [1] to [9], the measuring object 13 includes a toothed portion 13a on at least a part of an outer peripheral surface of the measuring object 13, and the toothed portion 13a includes teeth formed at equal intervals in an axial direction of the measuring object 13, and at least one of the two rotors 2 is composed of a gear that directly meshes with the toothed portion 13a.

According to the feature [11], in the stroke sensor 1, 1a described in the feature [10], each of both the two rotors 2 is composed of a gear that directly meshes with the toothed portion 13a.

According to the feature [12], in the stroke sensor 1 described in the feature [10], one of the two rotors 2 is composed of a gear that directly meshes with the toothed portion 13a, and the other of the two rotors 2 is composed of a gear that directly meshes with the one of the rotors 2.

Although the embodiments of the present invention have been described above, the embodiments described above do not limit the invention according to the scope of claims. Also, it should be noted that not all combinations of features described in the embodiments are essential to the means for solving the problems of the invention.

The present invention can be appropriately modified and implemented without departing from the gist thereof. For example, in the above embodiment, the case where the rack shaft 13 is used as the measuring object has been described. However, the present invention is also applicable to the detection of the stroke position of a member which is stroked other than the rack shaft.

Further, in the above-described embodiment, the case where the rotor 2 is a gear has been described, but the rotor 2 is not limited thereto. The rotor 2 may be a roller or the like that rotates due to friction with the measuring object.

The invention claimed is:
1. A stroke sensor configured to detect a stroke position of a rod-shaped measuring object that strokes in an axial direction, comprising:
two disk-shaped rotors configured to rotate along with a stroke of the measuring object;
a rotation detecting unit configured to detect rotations of the two rotors, respectively; and a stroke position detecting unit configured to detect the stroke position of the measuring object based on the rotations of the two rotors detected by the rotation detecting unit, wherein at least one of the two rotors is provided in direct contact with the measuring object, wherein the two rotors are provided side by side in an arrangement direction perpendicular to an axial direction of the measuring object and are provided so as to be adjacent to the measuring object in an arrangement perpendicular direction perpendicular to the axial direction and the arrangement direction, wherein each of the two rotors is provided in such a manner that a rotation axis direction of each of the two rotors is inclined with respect to the arrangement direction.

2. The stroke sensor, according to claim 1, wherein the rotation detecting unit comprises:

two rotor-side boards each being provided integrally with an end face in the rotation axis direction of each of the two rotors and having a conductor pattern formed in a predetermined pattern along a circumferential direction of each of the rotors;

two detection coils provided so as to face the two rotor-side boards, respectively, and provided so as not to rotate along with the rotations of the rotors; and detection circuits, each being configured to detect a rotation angle of corresponding one of the rotors based on a change in inductance of each of the detection coils when an AC voltage is applied to each of the detection coils.

3. The stroke sensor, according to claim 2, wherein the two rotors are arranged in such a manner that rotation axes of the two rotors are orthogonal to each other, and wherein the two detection coils are arranged in such a manner that magnetic field generation directions in the two detection coils when the AC voltage is applied are orthogonal to each other.

4. The stroke sensor, according to claim 2, wherein the two rotors are arranged in such a manner that the rotation angles of the two rotors when the measuring object is stroked are different from each other, and wherein the conductor patterns formed on the rotor-side boards provided on the two rotors are formed to have a same pattern configuration in respective circumferential directions of the rotors.

5. The stroke sensor, according to claim 2, wherein the two rotors are arranged in such a manner that the rotation angles of the two rotors when the measuring object is stroked are same, and wherein the conductor patterns formed on the rotor-side boards provided on the two rotors are formed to have pattern configurations different from each other in respective circumferential directions of the rotors.

6. The stroke sensor, according to claim 1, wherein the rotation detecting unit comprises:

two magnets, each being integrally provided with each of the two rotors;

a magnetic detection element being provided so as not to rotate along with the rotors and configured to detect magnetic fields from the two magnets, and detection circuits, each being configured to detect a rotation angle of a corresponding one of the rotors based on a detection result of a corresponding one of the magnetic detection elements.

7. The stroke sensor, according to claim 6, wherein the two rotors are arranged in such a manner that rotation axes of the two rotors are orthogonal to each other, and wherein the magnetic detection element comprises two magnetic detection elements being arranged in such a manner that magnetic field detection directions of the two magnetic detection elements being orthogonal to each other, and each of the two magnetic detection elements is configured to detect a magnetic field of a corresponding one of the two magnets.

8. The stroke sensor, according to claim 1, wherein the two rotors are arranged in such a manner that rotation axes of the two rotors are orthogonal to each other, and wherein the magnetic detection element is configured to detect magnetic fields in two directions orthogonal to each other and detect the magnetic fields of the two magnets in the two directions.

9. The stroke sensor, according to claim 6, wherein the two magnets have a same configuration, and the two rotors are configured in such a manner that rotation angles of the two rotors when the measuring object is stroked are different from each other.

10. The stroke sensor, according to claim 1, wherein the measuring object includes a toothed portion on at least a part of an outer peripheral surface of the measuring object, and the toothed portion includes teeth formed at equal intervals in an axial direction of the measuring object, and wherein at least one of the two rotors comprises a gear configured to directly mesh with the toothed portion.

11. The stroke sensor, according to claim 10, wherein each of both the two rotors comprises a gear configured to directly mesh with the toothed portion.

12. The stroke sensor, according to claim 10, wherein one of the two rotors comprises a gear configured to directly mesh with the toothed portion, and the other of the two rotors comprises a gear configured to directly mesh with the one of the rotors.

* * * * *